United States Patent [19]

Girard

[11] 4,330,825

[45] May 18, 1982

[54] DEVICE FOR AUTOMATIC CONTROL OF THE STORAGE CAPACITY PUT TO WORK IN DATA PROCESSING SYSTEMS

[75] Inventor: Paul Girard, Versailles, France

[73] Assignee: Compagnie Internationale Pour l'Informatique Cii Honeywell Bull (Societe Anonyme), Paris, France

[21] Appl. No.: 100,855

[22] Filed: Dec. 6, 1979

[30] Foreign Application Priority Data

Dec. 6, 1978 [FR] France .............................. 78 34413

[51] Int. Cl.³ ........................ G11C 5/02; G11C 29/00; G06F 13/00
[52] U.S. Cl. .................................... 364/200; 340/652; 340/687; 340/656; 365/63; 339/78
[58] Field of Search ... 364/200 MS File, 900 MS File, 364/554; 340/524, 531, 652, 687, 656; 339/78, 113 R; 365/63

[56] References Cited

U.S. PATENT DOCUMENTS

| | | |
|---|---|---|
| 3,191,095 | 6/1965 | Hefti . |
| 3,898,631 | 8/1975 | Brown et al. ....................... 364/200 |
| 3,967,251 | 6/1976 | Levine .................................. 364/200 |
| 4,025,903 | 5/1977 | Kaufman et al. ................... 364/200 |

Primary Examiner—Gareth D. Shaw
Assistant Examiner—Eddie P. Chan

Attorney, Agent, or Firm—Kerkam, Stowell, Kondracki and Clarke

[57] ABSTRACT

A device is provided for automatically determining the storage capacity of a data processing or transmission system and signalling when the storage capacity is inadequate to handle an incoming address. The store includes a plurality of storage fractions made up of storage modules adopted to be plugged into a printed circuit board having a conductor pattern thereon and connector locations disposed along the conductor pattern. The modules may be plugged into the circuit board and a full storage fraction is established when electrical continuity is established along the whole length of a conductor which connects all of the location localities assigned to a storage fraction. The conductor pattern is interrupted at the connection localities of the modules of one and the same storage fraction. First means are provided for detecting the presence of the storage modules installed in a system and develops a signal in response thereto which is applied to a limit address generator in the form of a priority under the output of the limit address generator corresponds to the installed storage capacity and is compared to an address for access to data in the store in a detector which provides an output alarm signal when the address for access exceeds the capacity of the store.

15 Claims, 8 Drawing Figures

DEVICE FOR AUTOMATIC CONTROL OF THE STORAGE CAPACITY PUT TO WORK IN DATA PROCESSING SYSTEMS

BACKGROUND OF THE INVENTION

1. Field of the Invention

The invention relates to a device for automatic control of the storage capacity put to work in automatic data processing systems or data transmission systems.

2. Description of the Prior Art

In data processing or data transmission systems the memories or stores store a more or less extensive volume of data. The extent of this volume of storage of data is referred to as the "Storage Capacity" of the system. The data contained in this volume is all registered by an address. Hence this volume contains a start address and an end address or storage capacity limit address. For obvious economic and commercial reasons the stores are cut up into modular elements. These storage elements or modules form pieces of the total storage and individually represent a small capacity. Hence their cost is much lower than a complete store.

At the start of its operation, a system may be operated with a store of small capacity made up of a few storage modules or even in certain cases only one module. Later on the storage capacity may be progressively extended up to its maximum value. But every time the storage capacity is modified by adding modules or by taking them away in the event of failure, it is necessary for the users of the systems to be warned and made aware of the change in order that they can employ the entire extent of available store, but within the exact limit of its capacity.

The display of the value of the capacity of the various stores employed in a system in order to continually inform the user of available capacity necessitates long and tedious manipulations over batteries of switches or wired connections for which the risks of errors are not negligible. These manipulations have to be undertaken at each instance of a new modification of the storage capacity. It is therefore the object of the present invention to make automatic the display of the storage capacity introduced as its real physical modifications proceed; to let this information be known directly to the organizations which are the users of the store; and to check the effective presence of all the storage modules when the modules are associated in order to form an indivisible fraction of the store in the case where a number of modules are associated in order to form an operational portion of storage.

SUMMARY OF THE INVENTION

The above and other objects of the invention are accomplished by ensuring that any storage module addition or withdrawal will be instantaneously known by the system which may be adapted immediately to the new situation. It follows from that, that any subsidiary intervention at the level of keys, cams or wired connections will be avoided and consequently, besides the gain in time procured, a protection will be obtained against possible errors in manipulation.

In order to obtain these results the device for automatic detection of the storage capacity of a data processing or transmission system in accordance with the invention is characterized in that it comprises a first detector for detecting the presence of storage modules in the system, a limit address generator for generating a capacity limit address of the storage capacity in the system, and a second detector for detecting when the storage capacity is exceeded which compares the capacity limit address transmitted from the generator with the addresses generated by the system when the latter are seeking access to the data contained in the storage modules.

BRIEF DESCRIPTION OF THE DRAWINGS

The invention will be better understood with the aid of the description when made in connection with the drawings, wherein, in accordance with the present invention.

DESCRIPTION OF THE PREFERRED EMBODIMENTS

Figure 1:
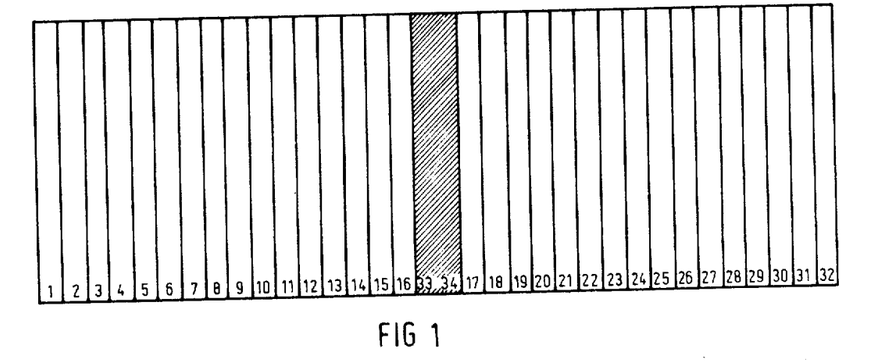
FIG. 1 represents a bank of 32 storage modules.

In the embodiment shown in FIG. 1, the storage system includes 32 storage modules. This sub-assembly, called a "unit" or "storage bank", may exist in a number of models in a system. Hence each of the storage capacities of these banks must be known to the organizations which are users of the store. Physically a storage bank is formed of a receptacle or basket equipped with a printed circuit called the "basket bottom" upon which connectors are mounted. A storage module is then realized on a printed circuit called a "storage board" which can be plugged into one of the basket bottom connectors, each of which corresponds to a printed circuit board. The connectors numbered 1 to 32 receive storage boards, that is to say, storage modules. The connectors numbered 33 and 34 corresponding with the hatched zone in FIG. 1 are reserved for the control logic of the storage bank. The control logic is connected to the remainder of the system through a set of signals known as the storage bank or unit interface.

Figure 2:
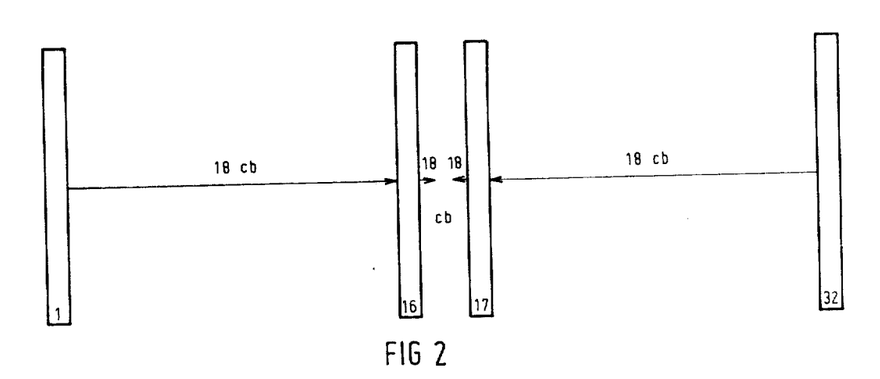
FIG. 2 shows an associaton of 4 storage modules which form an indivisible fraction of the storage bank.

In FIG. 2 an indivisible fraction of the store is represented by means of four storage modules. This number of storage modules illustrated is not absolutely limiting, but the number four is compatible with certain organizations of systems, for example, for employing at lowest cost a code which is self-corrective of error by working upon 72 digits whereas the storage module exhibits an interface of 18 binary digits. In such an arrangement 4 storage modules can be mounted in parallel in order to obtain the desired unit interface having 72 binary digits. It will, however, be necessary to ensure the effective presence of these 4 modules for each fraction of storage capacity introduced.

Figure 3:
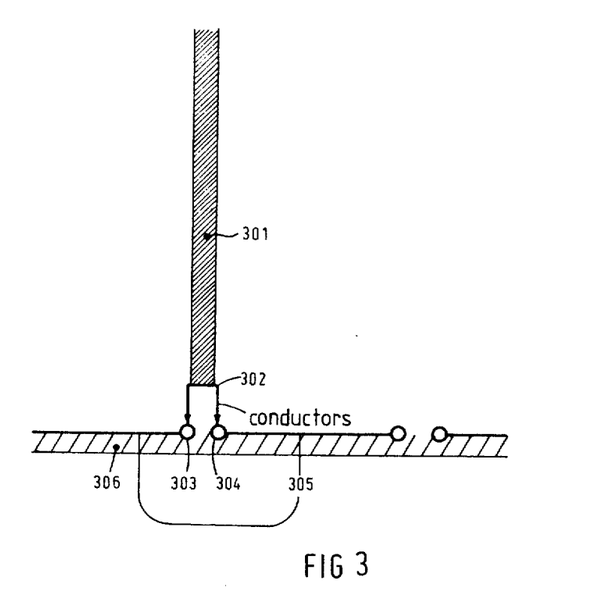
FIG. 3 represents the connection between a storage module and the basket-bottom printed circuit.

FIG. 3 represents the connection between a storage module and the basket bottom printed circuit. Each storage module 301 is equiped at its base as viewed in the drawing with a wired connection 302 which ensures electrical continuity between two connection points 303 and 304 of the basket bottom 306. By plugging the module into the connector corresponding with its location, this wired connection ensures electrical continuity of a conductor 305 drawn on the basket bottom circuit and connected to the connection points 303 and 304. In the absence of any module the electrical circuit drawn on the basket bottom is open. This circuit passes step by step in a manner which will be hereinafter described to the level of each module location.

Figure 4:
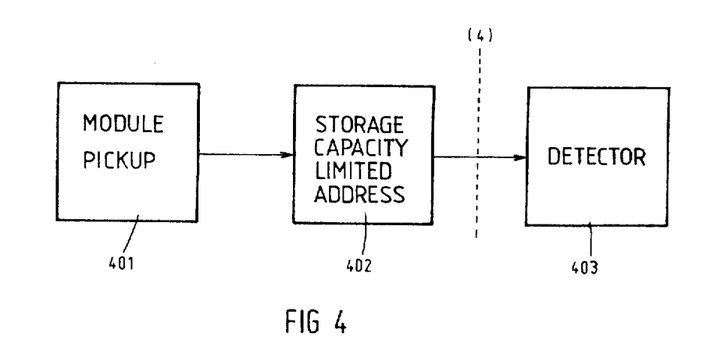
FIG. 4 represents in block diagram form the electronic devices necessary to put the invention into effect.

As represented in FIG. 4 the invention contemplates three devices. They are a pick up 401 for insertion of a module in the manner hereinbefore described; a storage capacity limit address generator 402, and a detector 403 for detecting when storage capacity has been exceeded.

The introduction of these 3 devices into a data processing or transmission system may be at various locations. For example, the capacity limit address generator may be located in a storage unit and the detector adapted to detect when capacity is exceeded in an organ which is a storage user, with the result that the interface between a module bank and the remainder of the system will lie between the devices 402 and 403, as represented by vertical dark line (4) in FIG. 4.

Figure 5:
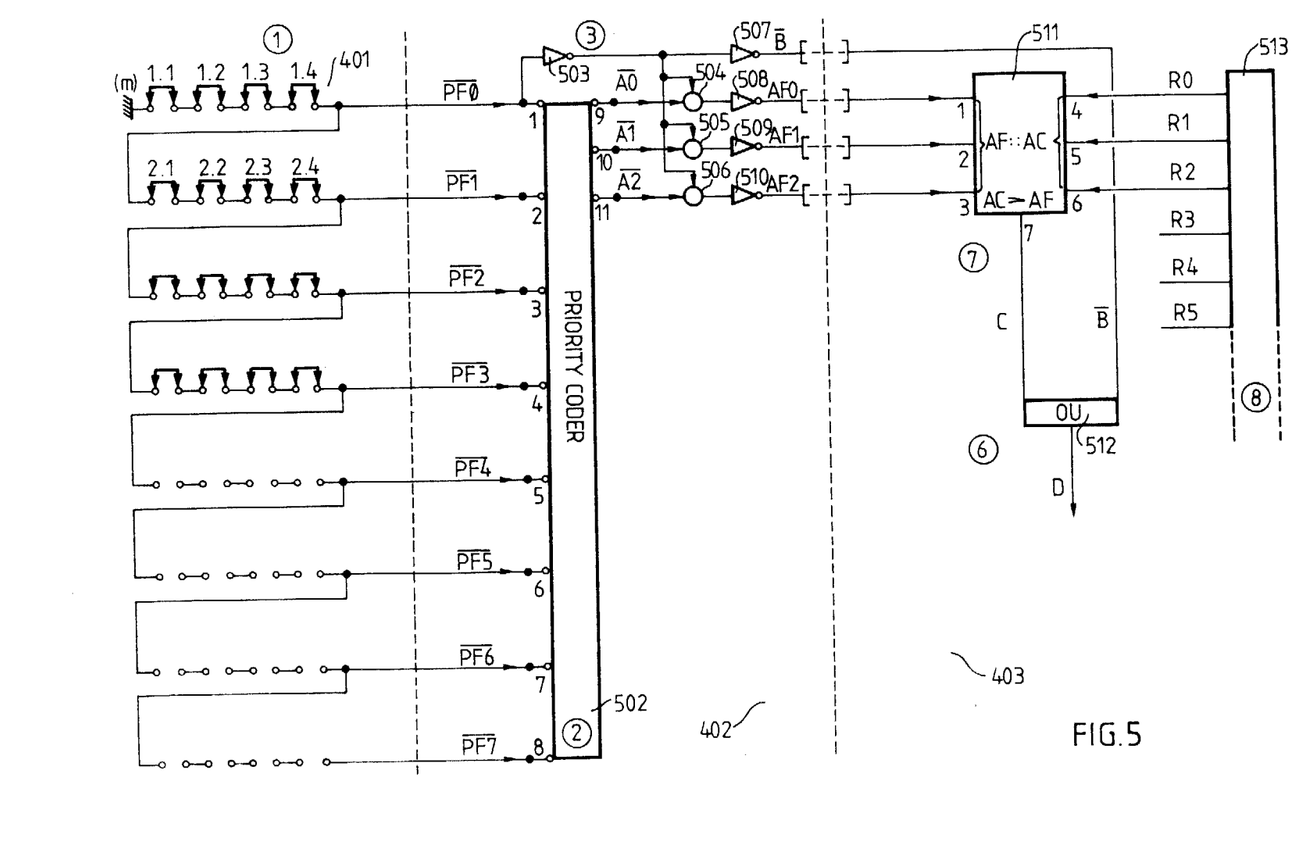
FIG. 5 represents in detail one embodiment of the devices represented in FIG. 4.

The detailed realization of the device for automatic control of storage capacity is represented in FIG. 5. The pick-up for module insertion 401 is essentially realized by the wiring of the basket bottom printed circuit. This wiring starts through an earth m, then passes in succession through the connectors associated with the first 4 modules symbolized by their wired connections 1.1, 1.2, 1.3, 1.4. A conductor from connector 1.4 then passes to the limit address generator under the equipotential label $\overline{PF\phi}$. The first 4 modules thus form the first fraction of the capacity of the storage bank.

The wired connections of the pick-ups of the various modules are in cascade so as to guarantee that the signal $\overline{PF\phi}$ will be connected to the potential "0" (to the earth m) only when the 4 modules which constitute the first fraction of storage capacity are present. Thus the simultaneous effective presence of modules which form this first fraction of storage capacity guaranteed when the signal $\overline{PF\phi}$ ("presence of the fraction" in complementary form) is at logic level 0. In the same way the completeness of the other storage fractions is ensured by adding the various fraction presence signals $\overline{PF1}$, $\overline{PF2}$, $\overline{PF3}$, etc... at logic level "0". The wired connections 2.1, 2.2, 2.3 and 2.4 of the modules forming the second fraction of storage capacity are likewise placed in series by connecting the input connection of connection 2.1 to the output of connection 1.4. Other storage fractions are similarly connected in series. Furthermore, in view of the fact that these successive groups of four pick-ups for wired connections corresponding with the consecutive fractions of the store are placed in series, it is not possible in the presence of a signal $\overline{PFn}$ or zero potential to have appear a fraction of the order n, if the fraction of the order n − 1 is not already introduced in its entirety.

Figure 6:
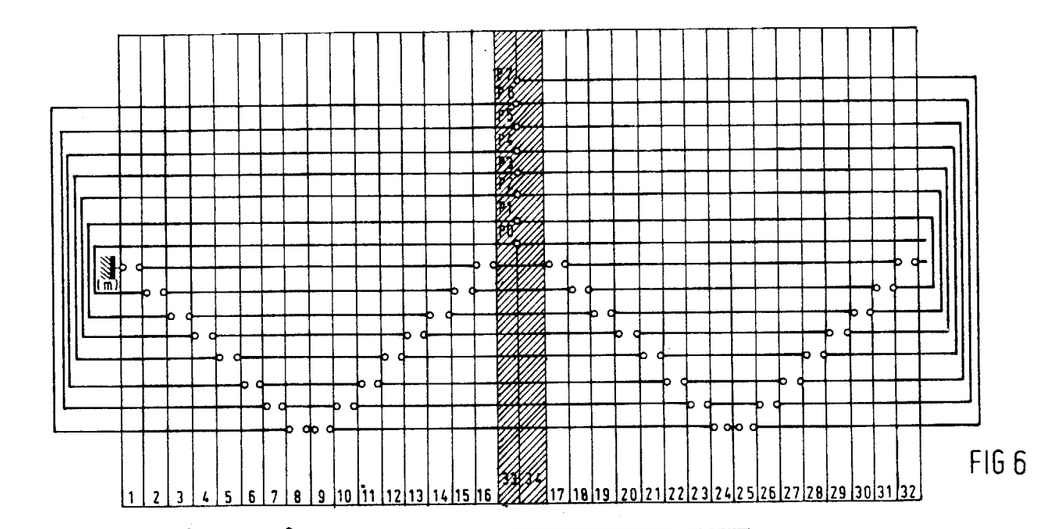
FIG. 6 represents the plan of the printed circuit forming the pick-up for insertion of storage modules.

Thus, for example, it is not possible to put to work an additional fraction of storage capacity, that is to say, applying a "zero" potential signal $\overline{PF1}$ to limit address 402, which indicates the presence of the second storage unit fraction, without having obtained before hand the logic level "zero" signal $\overline{PF\phi}$ through the preceding first 4 modules via connections 1.1, 1.2, 1.3, and 1.4 by the complete introduction of the first fraction of unit. This is recursive from $\overline{PF\phi}$ to $\overline{PF7}$. The design of the printed circuit which realizes the wiring of the pick-up for insertion of modules is given in FIG. 6. It appears in the form of a sort of helix. This arrangement offers the advantage of being inscribed in a single layer of printed circuit. The locations of the modules corresponding with the successive fractions of the storage unit are given by the following table;

| Storage unit fraction | Location of module |
|---|---|
| First | 1, 16, 17, 32 |
| Second | 2, 15, 18, 31 |
| Third | 3, 14, 19, 30 |
| Fourth | 4, 13, 20, 29 |
| Fifth | 5, 12, 21, 28 |
| Sixth | 6, 11, 22, 27 |
| Seventh | 7, 10, 23, 26 |
| Eighth | 8, 9, 24, 25 |

The conductor which delivers the signal for indication of the presence of the first fraction communicates at P$\phi$ with the control logic (hatched zone) after having collected the insertion pick-ups at 1, 16, 17 and 32 (all connections being made in common now) and received the earth m. It then returns in order to take in the following insertion pick ups: 2, 15, 18, 31 in order to deliver at P1 the signal corresponding to the presence of the second fraction. Following the path in spiral fashion, the third fraction is indicated by a signal at P2 which requires insertion of storage modules in pick ups 3, 14, 19 and 30, and the fourth, fifth etc. fraction follow in order as shown.

The capacity limit address generator 402 represented in FIG. 5 consists essentially of a mean scale integrated circuit designated under the name of "priority coder" 502. This circuit receives at its respective inputs 1, 2, 3, 4, 5, 6, 7 and 8 the signals $\overline{PF0}$, $\overline{PF1}$, $\overline{PF2}$, $\overline{PF3}$, $\overline{PF4}$, $\overline{PF5}$, $\overline{PF6}$ and $\overline{PF7}$. It delivers at its respective outputs 9, 10, 11 the binary values $\overline{A0}$, $\overline{A1}$, $\overline{A2}$. It may be defined by its truth table given by the two left-hand tables in FIG. 7 which express the binary configurations adopted by the output vector ($\overline{A0}$, $\overline{A1}$, $\overline{A2}$) as a function of the input vector ($\overline{PF0}$, $\overline{PF1}$, $\overline{PF2}$, ... $\overline{PF7}$). The crosses in the table of input vectors indicate that the binary values adopted for the components of the vector corresponding with the column in question may adopt immaterial binary values "zero" or "one". In fact, in the case of the device described the values adopted will be of the logic levels "zero".

Figure 7:
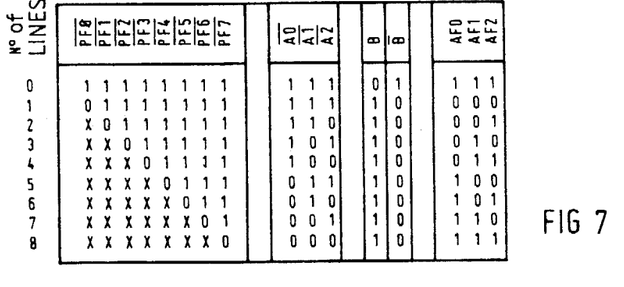
FIG. 7 represents the truth table giving the coding of the signals delivered by the address generator and the capacity limit detector.

As the storage capacity is extended, the input configurations are those appearing in the successive lines. Thus when there is no module plugged in the system, all of the input signals PF0 to PF7 are in the same state, that is to say, at the logical value "one" since no wired connection is plugged in, expressing the insertion of no module. Hence the first line of the table marked 0 gives us the input and output configurations in this case. It may be seen that the output vector is (A0, A1, A2) = (1, 1, 1). When the first series of four modules is plugged in, corresponding with the first fraction of unit introduced, a level "zero" appears on the conductor $\overline{PF0}$, without modification of the other signals $\overline{PF1}$ to $\overline{PF7}$. The input and output configurations are given by the second line or row of the table, marked 1. The output configuration remains unchanged. It will be differentiated by the circuits mounted after the priority coder. After the insertion of the next four modules corresponding with the second fraction of storage capacity, the third line or row marked 2 displays the input and output binary values and so on. It will be observed that the output vector ($\overline{A0}$, $\overline{A1}$, $\overline{A2}$) gives in coded and complemented binary form the location of the last fraction of storage capacity introduced, by starting with the value 0 in direct coding for the first fraction, then 1 for the second, etc . . . , up to 7 for the eighth.

An inverter 503 supplies the signal B at the true logic value "one" as soon as a first storage fraction is introduced by reversing the signal $\overline{PF\phi}$ which in this case has just taken the value "zero". This signal B is used to validate the signals ($\overline{A0}$, $\overline{A1}$, $\overline{A2}$) by means of a battery of "AND" circuits 504, 505, 506. After a series of new inversions by means of the inverters 507, 508, 509 and 510, connected respectively to the outputs of inverter 503 and gates 504, 505 and 506, the signals $\overline{B}$, AF0, AF1, AF2 are presented at the unit interface as the output from the limit-address generator. It will then be observed as is indicated in the two right-hand tables in FIG. 7 that the validation by the signal B of the signals $\overline{A0}$, $\overline{A1}$, $\overline{A2}$ enables the absence of a module to be differentiated for this vector from the insertion of the first fraction. The inversion due to the inverters 508, 509 and 510 ensures in addition the direct binary coding of the vector ($\overline{AF0}$, $\overline{AF1}$, $\overline{AF2}$) thus characterizing the capacity limit address (or boundary address) of storage introduced. (See columns AF0, AF1, AF2, of the table in FIG. 7). Finally the signal $\overline{B}$ obtained by the inverter 507 from the signal B enables the total absence of a module given on line 0 to be differentiated from the completely full storage unit configuration appearing in line 8, since in the two cases the interface vector ($\overline{B}$, AF0, AF1, AF2) adopts respectively the values (1,1,1,1) and (0,1,1,1); this will be turned to account in the utilization which is made of it by the next device.

The detector 403 for detecting when the storage capacity of the system is exceeded is represented in detail in FIG. 5 and has the purpose of supplying to the organization which is the user of the store a signal which will alert it either in the event of total absence of storage or, which comes to the same thing, as soon as the system tries to overstep the limit of the storage present. In order to do that, the OR circuit 512 yields the true logical value when the signal $\overline{B}$ is itself at a logic one, that is to say, when no storage module has been introduced (store entirely empty). In this case the system will immediately be able either to announce the absence of storage whatever the address that it tries, or be addressed to a storage unit if it has any available i.e., in the case of a multi-unit system.

The limit-address vector (AF0, AF1, AF2) is received over inputs 1, 2 and 3 of a mean integration circuit 511. Circuit 511 is a comparator and compares the coded binary value of this input with that appearing over its inputs 4, 5, 6. Inputs 4, 5 and 6 of comparator 511 receive the vector (R0, R1, R2) taken from the upper portion of an address register 513 of the organ which is the user of the storage block. The wires R0, R1, R2 as well as the next wires R3, R4, R5 etc . . . of lower weight are likewise directed towards the storage unit for the addressing. The comparator 511 delivers over its output 7 a signal C which expresses the mathematical inequality AC>AF where AC is the current address composed by the vector (R0, R1, R2) from the heavy weights from the address register 513 and AF is the limit-address vector (AF0, AF1, AF2) defined above. The signal C is transmitted over one input to the OR gate 512. The other input of OR gate 512 is the signal $\overline{B}$ from the inverter 507. The OR gate 512 delivers an alarm signal D when the signal C or the signal $\overline{B}$ is present. Thus as long as the user organ addresses the zone effectively introduced, for example, with the vectors (AF0, AF1, AF2)=(0, 0, 0) and (R0, R1, R2)=(0, 0, 0) in the first eighth of the unit the output signal C (AC>AF) remains at logic zero. There is no alarm D. The signal B at this point is also at logic zero since the store is not empty. If there is only one eighth of a unit present, as soon as the address register adopts the first value beyond the first eighth by displaying (R0, R1, R2)=(0, 0, 1) the following relationships are then proved: vector AC=(0, 0, 1) and vector AF=(0, 0, 0), hence vector AC>vector AF (0, 0, 1>0, 0, 0). The wire C supplies a logic one signal which releases the alarm D which enables the system immediately to bring back its address register 513 to a lower value compatible with the store which it has available. The mechanism operates in the following way at the level of the different capacities introduced, one quarter, three eights, etc . . . The division into eights is not limiting; smaller or larger fractions do not invalidate the principle of the invention.

The circuits forming the comparator 511 are well known; one can refer, for example, to the circuit sold commercially under the reference SN7485 by the TEXAS Instruments Company.

Figure 8:
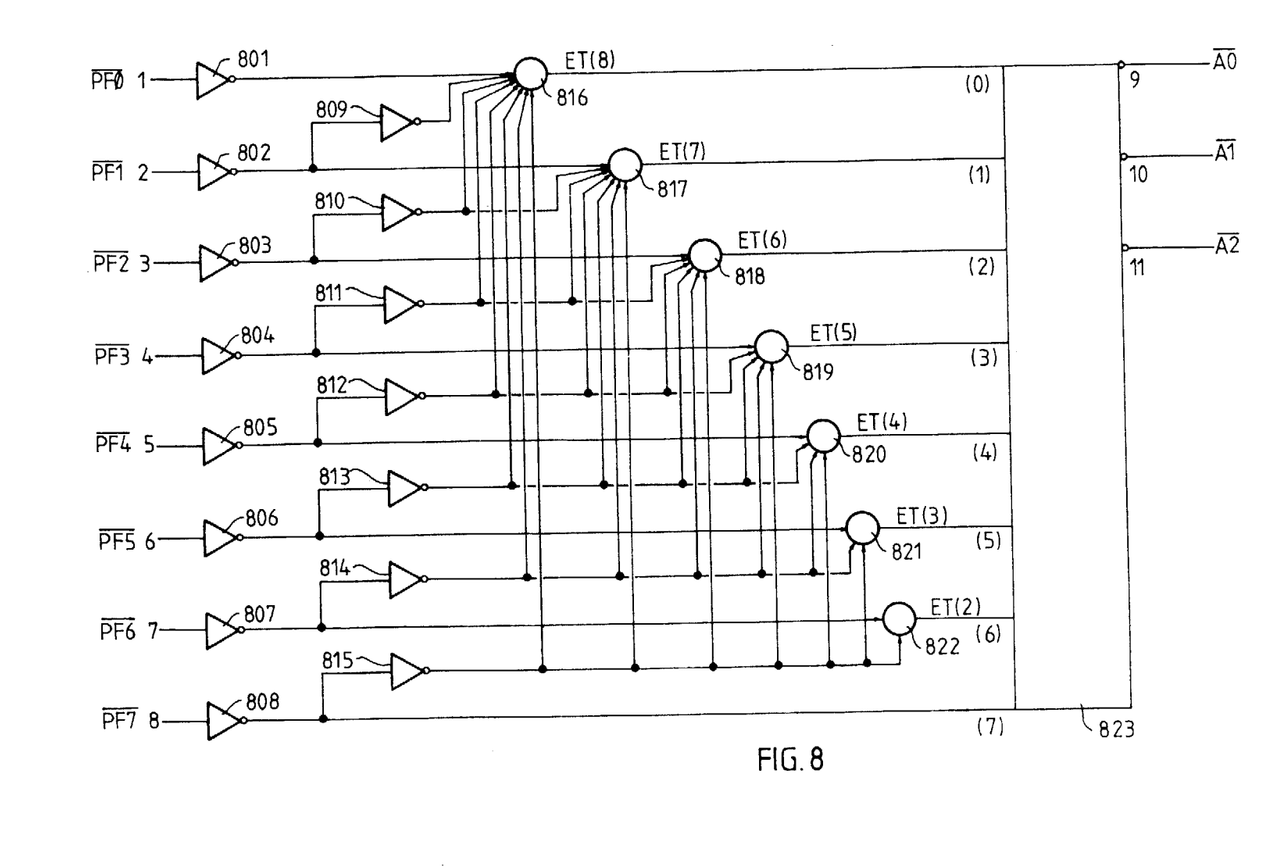
FIG. 8 is a representation of the priority coder employed in the device represented in FIG. 5.

FIG. 8 represents the diagram of the priority coder 502 shown in block form in FIG. 5. The signals $PF\phi$ to PF7 taken from the module insertion pick-up are applied respectively to the inputs to the inverters 801 to 808, the outputs of which are connected respectively to one input of AND gates 816 to 822. The outputs from the inverters 802 to 808 are also connected respectively to the inputs to the inverters 809 to 815. The AND gates 816 to 822 control the respective inputs 0 to 7 of the inputs 0 to 6 of a conventional binary decimal coder and are validated by the respective outputs from the inverters 809 to 815. In such a way as to produce the following logical functions:

| ET816 | = | PF0 ∩ | i = 7<br>i = 1 | $\overline{PF}_i$ | = PF$_0$ ∩ $\overline{PF}_1$ ∩ $\overline{PF}_2$ ∩ ..... $\overline{PF}_7$ |
|---|---|---|---|---|---|
| ET817 | = | PF1 ∩ | i = 7<br>i = 2 | $\overline{PF}_i$ | |
| ET818 | = | PF2 ∩ | i = 7<br>i = 3 | $\overline{PF}_i$ | |
| ET819 | = | PF3 ∩ | i = 7<br>i = 4 | $\overline{PF}_i$ | |
| ET820 | = | PF4 ∩ | i = 7<br>i = 5 | $\overline{PF}_i$ | |
| ET821 | = | PF5 ∩ | i = 7<br>i = 6 | $\overline{PF}_i$ | |
| ET822 | = | PF6 ∩ | | $\overline{PF}_7$ | |

The sign employed is the sign of the logical intersection. The input 7 from the coder 823 is connected to the output from the inerter 803. This circuit is otherwise commercially known and available, for example, from the FAIRCHILD Company under its reference 9318.

The example which has just been given of a preferred embodiment of the invention is not absolutely limiting and it will be obvious to those skilled in the art and aquainted with the techniques of data processing or transmission to imagine other embodiments and variations without thereby departing from the true spirit and scope of the invention as defined by the appended claims and it is intended by these claims to cover all such variations.

I claim:

1. In a circuit arrangement for automatically determining the storage capacity of a data processing or transmission system having a store and data processing circuits adapted to generate addresses for access to data contained in the store, said store being divided up into a plurality of serially connected storage fractions, including a first fraction and at least one additional fraction, each storage fraction comprising a plurality of electronic storage modules, means for plugging each electronic module into a printed circuit board having printed conductors thereon arranged in cascade and space from each other at selected locations in order to effect connections between the storage modules of the store and data processing circuits, first means on said printed circuit board for detecting when all of the storage modules corresponding to the first fraction have been plugged into said board and developing a first signal in response thereto, second means on said printed circuit board for detecting when all of the storage modules of said at least one additional fraction have been plugged into said board for generating a second signal corresponding to a storage fraction other than the first of the serially connected fractions only when the preceding fraction is present, a limit address generator for generating a capacity limit address corresponding to the number of fractions plugged into the board and defining the storage capacity of the system, said address generator having its inputs connected to receive the signals developed by the first and the second means and arranged for generating a capacity limit address signal, and detection means for detecting when the storage capacity of the system is exceeded, said detection means including a detector operably connected for comparing the capacity limit address signal derived from the limit address generator with the addresses generated by the data processing circuits when the latter generate an address for access to the data contained in the said storage modules.

2. A circuit arrangement for automatically determining the storage capacity of a data processing or transmission system, in accordance with claim 1, wherein the first means for detecting when the storage modules have been plugged into the board consists of at least one of said conductors on the printed circuit board, said at least one of said conductors being divided into sections at each location where a module is to be plugged in and having connection localities for each module at said locations and the electrical continuity between said conductor and said module being established by the insertion of the module into said connection localities.

3. A circuit arrangement for automatically determining the storage capacity of a data processing or transmission system, in accordance with claim 2, wherein the first and second means for detecting when the storage modules have been plugged into said board are arranged to generate respectively first and second signals when a corresponding storage fraction is full and when electrical continuity is established along the whole length of the conductor which connects all of the connection localities of that storage fraction.

4. A circuit arrangement in accordance with claims 1, 2 or 3, wherein the printed conductors comprise a number of substantially parallel conductor lines, each line being interrupted at the connection localities of the modules associated with a storage fraction.

5. A circuit arrangement device for automatically determining the storage capacity of a data processing or transmission system, in accordance with claim 1, wherein the limit address generator includes circuit means having a plurality of inputs connected to receive the first and the second signals delivered by the first and the second means for detecting when the storage modules have been plugged into said board and developing an output indicative of the last storage fraction installed.

6. A circuit arrangement for automatically determining the storage capacity of a data processing or transmission system, in accordance with claim 1, wherein the detection means for detecting when the storage capacity of the system is exceeded includes a comparator operably connected to compare the number of the last storage fraction installed with the number of the fraction to which the processing circuits are addressed to have address, and alarm means for providing an alarm signal when the storage fraction number addressed is greater than the number of the installed storage fraction.

7. In a circuit arrangement for automatically determining the storage capacity of a data processing or transmission system comprising at least one store and data processing circuits adapted to generate addresses for access to data contained in the store, said store being divided up into a plurality of serially connected storage fractions including a first fraction and at least one additional fraction, each storage fraction comprising a plurality of electronic storage modules, a printed circuit board having printed conductors thereon, means for plugging each of said electronic module into the printed conductors of said printed circuit board in order to effect connection between the storage modules of the store and the data processing circuits, first means on said printed circuit board for detecting when all of the storage modules of each fraction have been plugged into said board and developing first and second signals in response thereto; a limit address generator responsive to said first and second signals for generating a capacity limit address corresponding to the number of fractions plugged into the board and defining the storage capacity of the system, and said printed conductors being mounted in cascade so as to allow the first means to generate said second signals for the storage fractions other than the first of the serially connected fractions only when all the storage modules of the preceding fractions have been plugged in and detection means connected to said limit address generator and said data processing circuits for detecting when the data processing circuits generate an address which exceeds the storage capacity of the system.

8. A circuit arrangement for automatically determining the storage capacity of a data processing of transmission system, in accordance with claim 7, wherein the first means for detecting when all of the storage modules of each fraction have been plugged into the board comprises at least one of said conductors on the printed circuit board, said conductor being divided into sections at each location where a module is to be plugged in and having connection localities for each module at said locations and the electrical continuity between said conductor and said module being established by the insertion of the module into said connection localities.

9. A circuit arrangement for automatically determining the storage capacity of a data processing or transmission system, in accordance with claim 7, wherein said first means for detecting when the storage modules of each fraction have been plugged in are arranged to signal that a storage fraction is full when electrical continuity is established along the whole length of the conductor which connects all of the connection localities of a storage fraction.

10. A circuit arrangement in accordance with claims 7, 8 or 9, wherein the printed conductors comprise a number of substantially parallel conductor lines, each line being interrupted at the connection localities of the modules associated with a storage fraction.

11. A circuit arrangement for automatically determining the storage capacity of a data processing or transmission system, in accordance with claim 7, wherein the means for detecting when the storage capacity of the system is exceeded further includes a comparator operably connected to compare the number of the last storage fraction installed with the number of the fraction to which the processing circuits are addressed to have address, and means for providing an alarm signal when the storage fraction number addressed is greater than the number of the installed storage fraction.

12. A circuit arrangement for automatically determining the storage capacity of a data processing or transmission system, in accordance with claim 10, wherein the limit address generator for generating a capacity limit address of the storage capacity generates an address upon plugging all of the electronic modules corresponding to a fraction into a board which is indicative of the number of storage fractions physically installed in the system.

13. A circuit arrangement for automatically determining the storage capacity of a data processing or transmission system, in accordance with claim 10, wherein the means for detecting when the storage capacity of the system is exceeded includes a comparator operably connected to compare the number of the last fraction installed with the number of the fraction to which the processing circuits are addressed to have address, and means for providing an alarm signal when the storage fraction number addressed is greater than the number of the installed storage fraction.

14. A circuit arrangement for automatically determining the storage capacity of a data processing or transmission system, in accordance with claim 12, wherein the limit address generator includes circuit means having a plurality of inputs connected to receive signals delivered by the means for detecting when all of the storage modules have been plugged into said board and an output indicative of the last storage fraction installed.

15. A circuit arrangement device for automatically determining the storage capacity of a data processing or transmission system, in accordance with claim 13, wherein the limit address generator includes circuit means having a plurality of inputs connected to receive signals delivered by the first means for detecting when the storage modules have been plugged into said board and an output indicative of the last storage fraction installed.

* * * * *